UNITED STATES PATENT OFFICE.

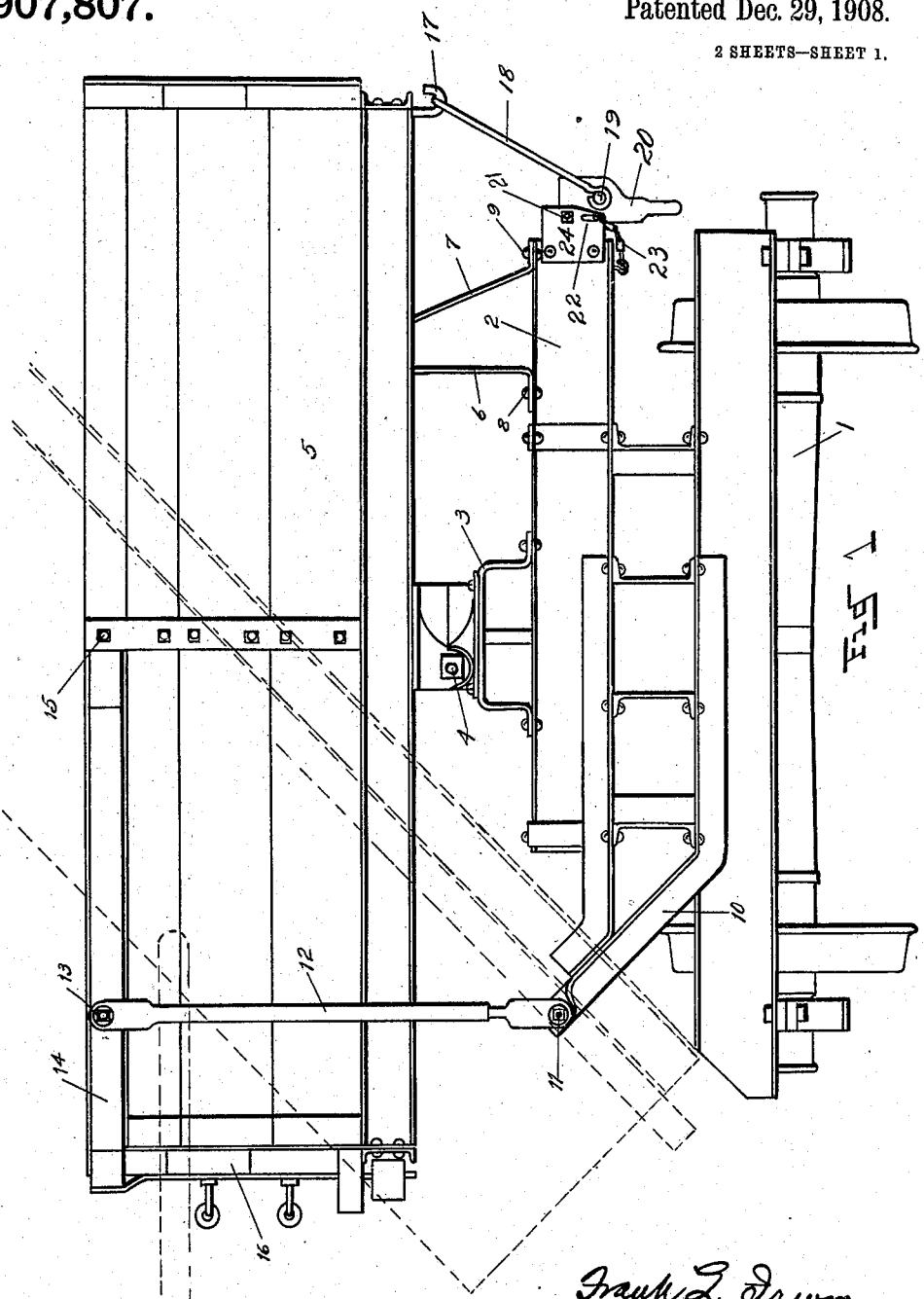

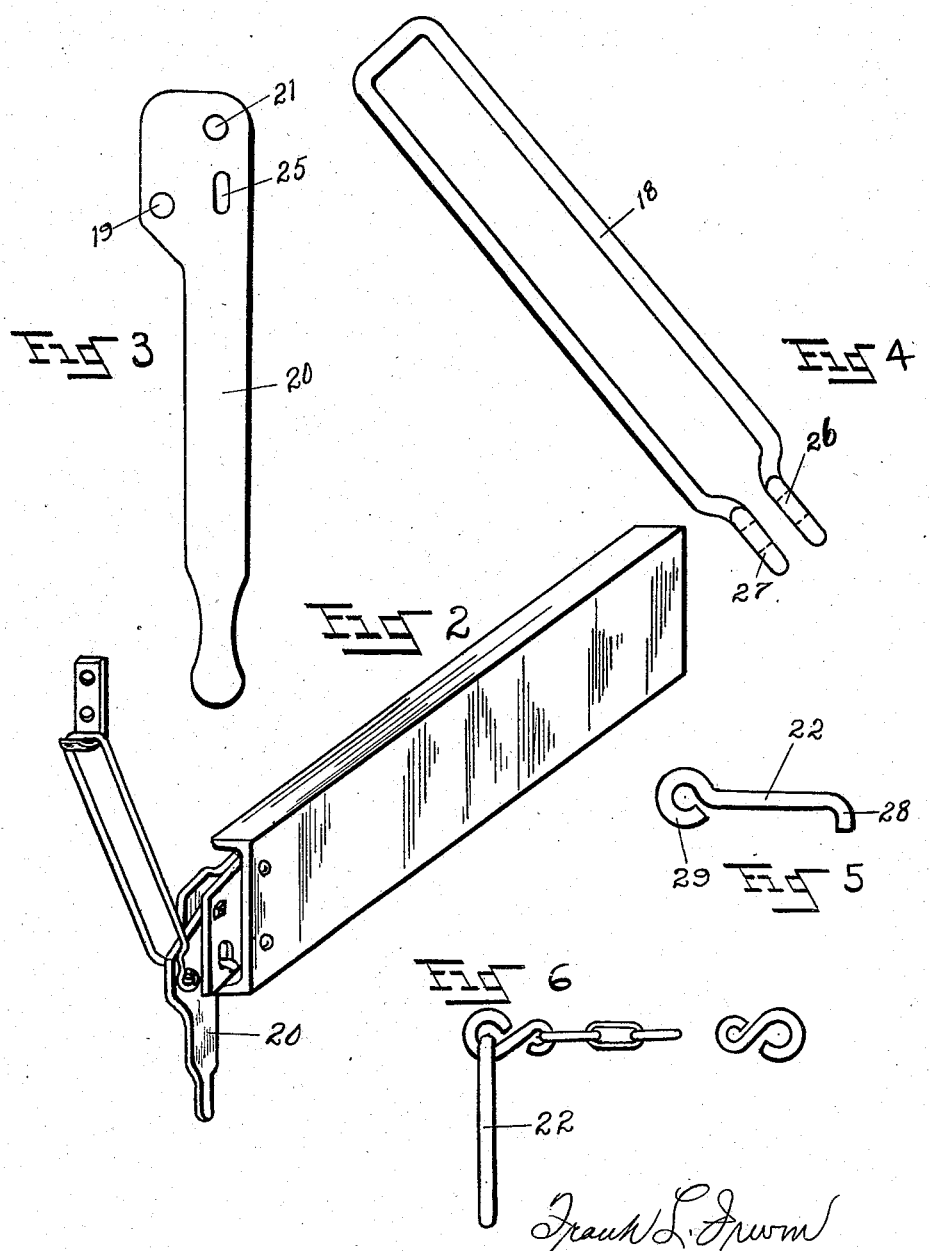

FRANK L. IRWIN, OF COLUMBUS, OHIO, ASSIGNOR TO THE RALSTON STEEL CAR COMPANY, OF COLUMBUS, OHIO, A CORPORATION OF OHIO.

LOCKING DEVICE FOR DUMP-CARS.

No. 907,807.    Specification of Letters Patent.    Patented Dec. 29, 1908.

Application filed June 19, 1908. Serial No. 439,332.

*To all whom it may concern:*

Be it known that I, FRANK L. IRWIN, a citizen of the United States, residing at Columbus, in the county of Franklin and State of Ohio, have invented certain new and useful Improvements in Locking Devices for Dump-Cars, of which the following is a specification.

My invention relates to improvements in locking devices for dump cars, and although shown in the drawings as applied to a car which is adapted to dump in one direction only, yet it is adapted to a car constructed for dumping in both directions.

It consists essentially of a link adapted at one end to engage the car and at its other end secured to a swinging lever which may be operated to secure the engagement of a link with a car or to release the same; it is adapted to lock positively and to release positively and is preferably manually operated. The link controlling lever is preferably pivotally mounted upon the underframe of the car, and is constructed so that the lever and the link may readily be separated or assembled, and when in its locking position, the lever is adapted to be secured, preferably by means of a removable pin.

All operations of my improved lock are positive and when locked it cannot, through the operation of the car, be disengaged unintentionally. Hitherto car beds in cars of this description have been secured to the end frame by devices which during the operation of the car are likely to be shaken loose, and for this and other reasons are unsatisfactory constructions.

Referring to the drawings which are hereto attached and hereby made a part of this specification, Figure 1 is an end view of a car having my improved locking devices thereon; Fig. 2 is a perspective of the channel forming a portion of the underframe construction of the car to which the lock manipulating lever is pivoted, showing also the locking link; Fig. 3 is a detail of the locking lever; Fig. 4 is a detail of the link; Fig. 5 is a detail of the pin securing the lever in locked position; Fig. 6 is a view showing the pin in connection with the chain, illustrated in Fig. 1.

Referring to the drawings in which the same numeral indicates the same part throughout, 1 is a truck having mounted thereon the underframe construction of which the channel 2 is a part, upon which there is mounted bracket member 3 adapted to receive the pivot 4 whereby the box 5 is mounted upon the underframe construction to swing thereon. Rising from the underframe are the bars 6 and 7 secured to the underframe at 8 and 9, and which are adapted to form a supporting member for said car box 5 when in its normal position. A member 10 is mounted upon the underframe construction and carries pivotally mounted thereon at 11 the dumping arm 12, which at its upper end is pivotally connected at 13 to the bar 14 which is pivoted to the car box at 15 and at its other end carries the door 16, whereby, when the car box is dumped into the position shown in the dotted lines, the door is maintained in its elevated position, and the car box being tilted, the lading will be discharged therefrom in a well known manner.

To permit the car box to be dumped, the locking construction must be released, and, referring to Fig. 1, it is seen that this construction embodies a hook member 17 secured upon the car box, and the link member 18 pivoted at 19 upon the lever 20; said lever 20 is pivoted to the underframe of the car at 21, and in the construction shown, may be swung towards or away from the center of the car. When in its locked position as shown in Fig. 1, the pin 22 suspended from the underframe by the chain 23 is thrust through the opening 24 in the underframe to enter the registering opening shown at 25 in Fig. 3, in the lever 20. The lever 20 is preferably provided with lugs on each side thereof as shown at 19 and the link 18, has the hooks 26 and 27 formed thereon to take over the lugs 19. The other end of the link engages the hook 17, and, as shown in Fig. 1, the link is properly positioned to hold the car box in its normal position.

To dump the car, the pin 22 is removed and lever 20 is grasped by the operator and swung outwardly on its pivot 21 whereby link 18 is lifted to clear the hook member 17, and, if loosely pivoted at 19, said link 18 will drop downwardly away from the car box, whereupon the latter is free to be dumped. If the link 18 is not loosely positioned upon the lugs 19, when said link has been lifted out of engagement with the hook 17 it may be manually swung aside to permit the car box to be tilted; the tilting operation would ordinarily be performed manually. The lever being pivoted to the underframe and the link being pivoted to the lever and the pin being suspended from a chain on the underframe, the parts are securely held in position on the car; it is apparent also that they may be readily positioned thereon for service and may be quickly and easily detached therefrom for repairs or other purposes.

It will be noted that the opening 25 in the lever 20 and the opening 24 in the underframe are slotted openings, adapted for the reception of the curved pin 22; when the pin 22 is inserted through the slotted openings after opening 25 has been brought into register with opening 24, the downwardly curved hook portion 28 of pin 22 may be inserted therethrough, and the advisability of the slotted formation is apparent; when the pin 22 has been inserted through the registering openings, the hook portion 28 at one end engages against the underframe, while the loop portion 29 at the other end also drops down into engagement with the underframe. Therefore, pin 22 is very unlikely to be jarred out of its position by the operation of the car and may therefore be said to be positive in its effects.

I do not desire to confine myself to the specific construction shown, but claim all modifications which are within the spirit of my invention.

What I claim is:

1. In a dump car a locking device comprising a hook member on the car box, a lever pivoted on the underframe, and a link movable by the said lever to engage or be disengaged from said hook member.

2. In a dump car, a locking device comprising a hook member on the car box, a lever pivoted to the underframe, lugs on said lever, a link member adapted to engage said lugs and to be actuated by said lever into firm locking engagement with said hook member.

3. In a dump car, a locking device comprising a hook member on the car box, a lever pivoted to the underframe, lugs on said lever, a divided link engaging said lugs to be actuated by said lever into open position, and means for fixing said lever in locked position.

4. In a dump car, a hook member on the car box, a swinging lever on the underframe, laterally projecting lugs on said lever, a divided link member provided with hooks at its ends to engage said lugs and adapted to be manipulated by said lever into locking or unlocking position with respect to said hook member, said lever and said underframe being provided with openings adapted to be brought into register when said lever is in locked position, and a pin adapted to be inserted through said registering openings and said lever to maintain the latter positively in its locked position.

5. In a dump car, a hook member mounted on the car box, a swinging lever mounted on the underframe, a link member pivotally secured to said lever and adapted to be brought into engagement with said hook member, said hook lever and said underframe having slotted openings adapted to be brought into register, a pin having a hook at one end and a loop at the other adapted to be inserted through said registering openings whereby said lever is positively secured in locked position.

In testimony whereof I affix my signature in the presence of two witnesses.

FRANK L. IRWIN.

Witnesses:
 HORACE KERR,
 A. RAGER.